Patented Aug. 3, 1943

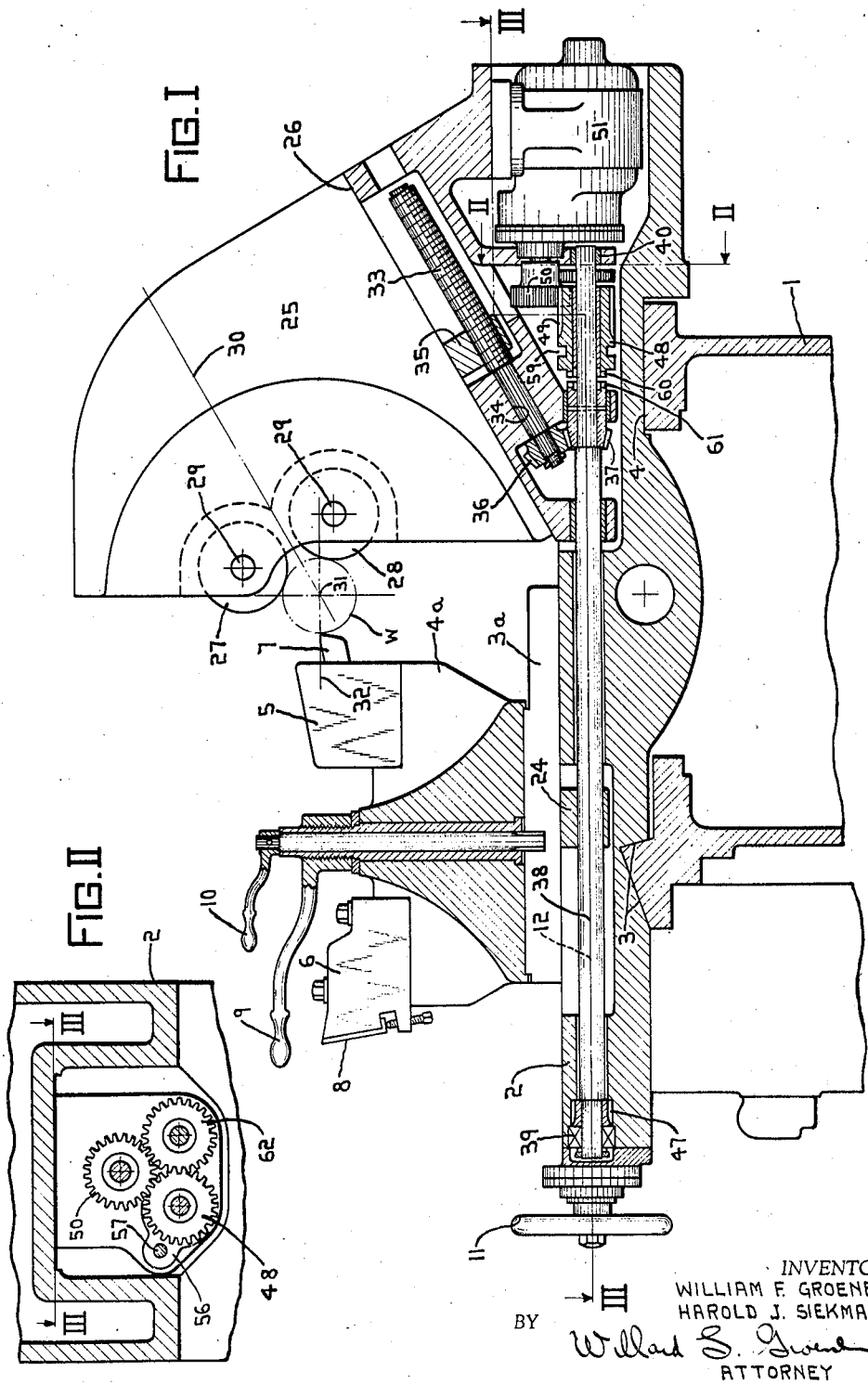

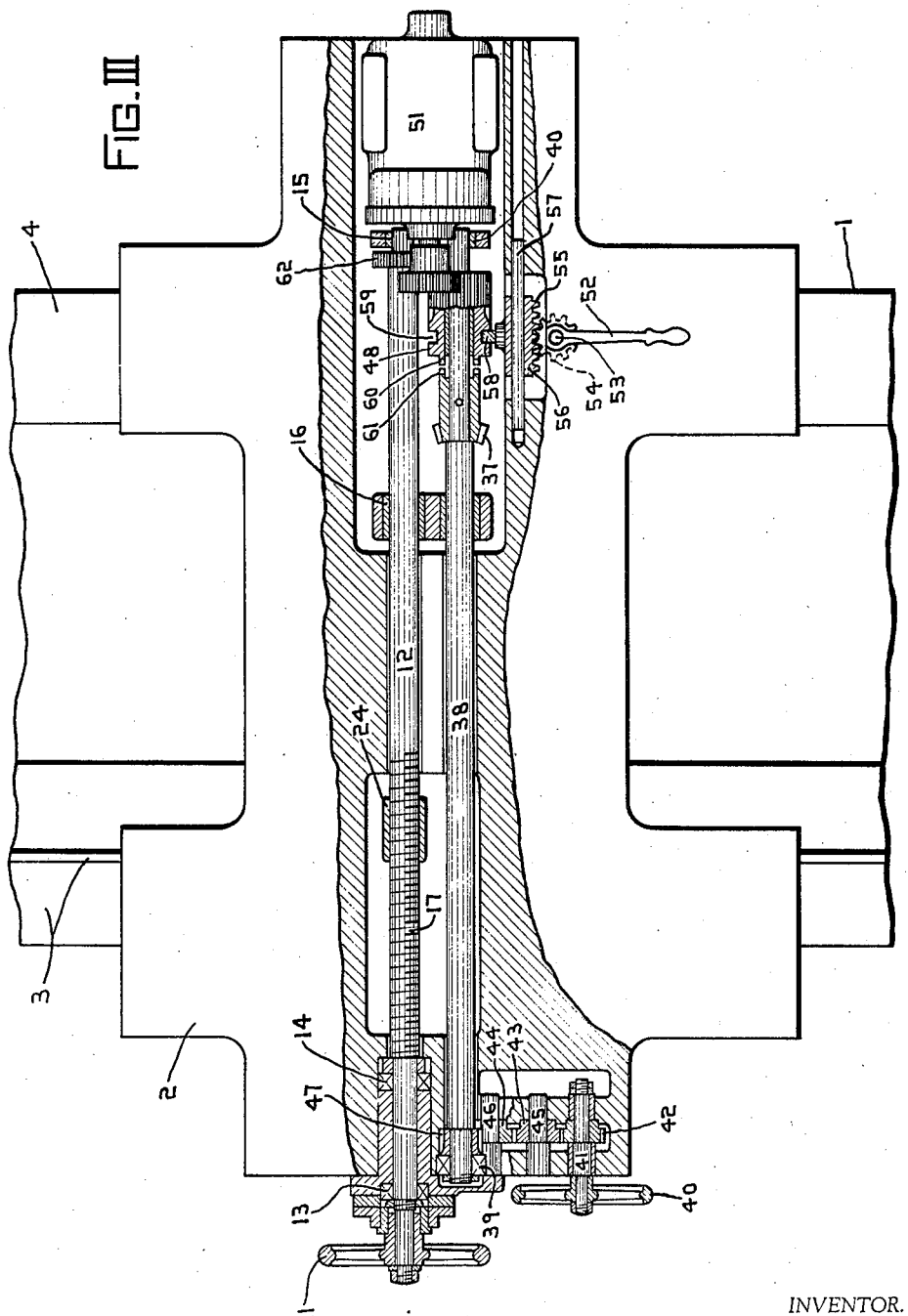

2,325,849

UNITED STATES PATENT OFFICE 2,325,849

STEADY REST FOR LATHES

William F. Groene and Harold J. Siekmann, Cincinnati, Ohio, assignors to The R. K. LeBlond Machine Tool Company, Cincinnati, Ohio, a corporation of Delaware Application October 12, 1942, Serial No. 461,662

2 Claims. (Cl. 82—38)

This invention pertains to steady rests for lathes, and is particularly related to steady rest mechanism associated with the tool slides and cutting tools of a lathe. One of the chief objects of the invention is to provide a steady rest or backup rest for engaging a work piece to oppose the cutting forces applied to the work piece by cutting tools operating upon it. More specifically, it is the object to provide steady rest means having a pair of work engaging rollers carried therein and which rollers may be simultaneously moved toward the work axis so as to engage the cylindrical surface of the work piece at uniform distances for each roller from its axis of rotation.

It is a further object of this invention to so arrange the steady rest or backup rest having a pair of rollers so that these rollers move toward the work piece in a direction at a substantial angle to the direction of the feeding of the tools toward the work axis while at the same time maintaining uniform and accurate contact of both of the rollers with the cylindrical surface of the work piece being machined.

Another object of this invention is to provide in a lathe having a tool slide with a cutting tool movable to and from the work piece, and a steady rest or backup rest associated with said cutting tool, means for rapidly advancing or retracting either the cutting tool feeding slide or the steady rest device to or from the work and to effect the final initial and accurate setting of either of these members by suitable manual feed.

Further features and advantages of this invention will appear from the detailed description of the drawings in which:

Figure I is a transverse section of a lathe incorporating the novel steady rest and tool slide arrangement of applicants' invention.

Figure II is a fragmentary sectional view on the line II—II of Figure I particularly showing the relationship of the rapid traverse motor drive pinion and the associated gears on the tool slide and steady rest actuating shafts.

Figure III is a plan view, partly in section on the line III—III of Figures I and II, particularly showing the relationship of the rapid traverse driving motor and the associated actuating rod for the tool slide and steady rest devices.

This invention is shown applied to a typical lathe having a bed 1 upon which is longitudinally slidable a carriage 2 on suitable ways 3 and 4 of the bed. On the front portion of the carriage 2 is mounted the cross slide 3a on appropriate dove-tail guide ways (not shown) for cross travel movement with respect to the lathe bed 1 and work W. On this cross slide 3a is mounted, in this instance, a multiple tool turret 4a having various tool holders 5 and 6 containing cutting tools 7 and 8 which may be swung into the cutting position of cutting tool 7 by appropriately manipulating the control levers 9 and 10 as is typical of such turret type multiple tool holding devices for lathes.

The cross slide 3a may be actuated manually in cross slide movement by means of the hand wheel 11, Figure III. This hand wheel 11 is carried on the cross feed screw 12 journaled in the bearings 13, 14, 15, and 16 in the carriage 2. Rotation of this cross feed hand wheel 11 effects rotation of the cross feed screw 12 and through the medium of its thread 17 operating in the nut 24 attached to the bottom of the cross slide 3a, the cross slide 3a may thus be actuated in cross movement on the carriage 2.

On the rear of the carriage is mounted the steady rest 25 which is slidable on suitable inclined dove-tail guide ways 26 so that the path of motion of the work engaging rollers 27 and 28 carried on appropriate pins 29 in the steady rest 25 is in the direction of the line 30 passing through the axis of rotation 31 of the work piece W. It will be noted that this line 30, representing the direction of travel of rollers 27 and 28, is at a substantial angle to the line of feed 32 of the various cutting tools 7 and 8 on the turret 4a of the cross slide 3a. These rollers 27 and 28 are axially positioned with respect to the axis 31 so that they both properly engage and position the work W with respect to its true axis of rotation 31 to which it is to be machined in the lathe. The angular direction of movement of this steady rest 25 in the direction of the line 30 permits both rollers 27 and 28 to properly engage the work simultaneously and accurately without individual adjustment of each of the rollers while at the same time positioning the points of contact of the rollers 27 and 28 so as to absorb all distortive forces which may be imparted to the work piece by the cutting tool 7 operating thereon in feeding in the direction of the line 32.

The steady rest 25 may be actuated in its angular movement by means of the screw 33 appropriately journaled against axial movement in a suitable bearing 34 of the carriage 2 which operates in a nut 35 fixed to the bottom of the steady rest 25. A suitable bevel pinion 36 fixed to the end of the screw 33 is engaged by a mating bevel pinion 37 fixed to the steady rest actuating shaft 38 appropriately journaled in suitable bearings 39 and 40. Shaft 38 may be rotated for actuating the screw 33 and thereby the steady rest 25 manually to and from the work W by the manipulating hand wheel 40 journaled on a shaft 41 in the carriage 2 and which has a gear 42 driving through the respective pinion gears 43 and 44 on the studs 45 and 46 which engage a gear 47 fixed on the shaft 38.

On the steady rest actuating rod 38 is journaled a sliding clutch gear 48 having gear teeth 49 formed thereon which are constantly in mesh with the gear 50 of an electric driving motor 51. This clutch gear 48 may be moved axially of the shaft 38 by any suitable means such as the handle 52, Figure III, carried on a rock shaft 53 having a gear 54 engaging in a rack 55 of the shifter yoke 56 carried on a rod 57 and which has a pin 58 operating in an annular slot 59 in the clutch gear 48 so that the clutch teeth 60 of the clutch gear 48 may be engaged with the clutch teeth 61 formed on the pinion 37 fixed to the shaft 38 or gear 48 may be moved in the opposite direction to engage the gear teeth 49 with a gear 62 fixed on the cross feed screw 12. In this way the driving power from the motor 51 may be alternately applied to the cross feed screw 12 or the steady rest actuating shaft 38 and thereby effect rapid traversing motion of these members in either direction by reversal of the electric motor 51 so as to rapidly present or withdraw either the tool feeding device or the steady rest device with respect to the work W. Final nicety of adjustment is effected by the respective hand wheels 11 and 40 for controlling the movement of the tool slide and steady rest.

Having thus fully set forth and described our invention what we claim as new and desire to secure by United States Letters Patent is:

1. In a lathe, a bed, a carriage mounted on said bed, a cross slide mounted on said carriage, a cutting tool mounted on said cross slide, a steady rest mounted on said carriage for movement to and from a work piece in said lathe in a direction angularly related to the relative movement of the cutting tool on said cross slide with respect to the work piece, work contacting rollers in said steady rest one located substantially above said work piece in said lathe, a second roller on said steady rest substantially diametrically opposite the point of contact of the cutting tool on said cross slide with the work piece, and means for adjusting the relative movement of said cross slide and steady rest relative to a work piece in said lathe, and power rapid traverse means alternately engageable with one or the other of said adjusting means for rapidly presenting or withdrawing either said cross slide and its tool or said steady rest and its rollers relative to said work piece.

2. In a lathe, a bed, a carriage longitudinally movable on said bed, a cross slide movable perpendicular to the axis of rotation of a work piece in said lathe mounted on said carriage, a cutting tool mounted on said cross slide, a steady rest mounted on an inclined guide way for movement to and from said work piece in said lathe from a direction angularly related to the direction of movement of said cutting tool relative to said work piece, work engaging portions on said steady rest to support said work piece against cutting forces imposed thereon by cutting action of said cutting tool, individual manual means for adjusting said cross slide or said steady rest and power means alternately engageable to rapidly traverse either said cross slide or said steady rest to and from work engaging position.

WILLIAM F. GROENE.
HAROLD J. SIEKMANN.